US010294844B2

(12) United States Patent
Görgen et al.

(10) Patent No.: US 10,294,844 B2
(45) **Date of Patent: *May 21, 2019**

(54) METHOD FOR OPERATING A DRIVE DEVICE AND CORRESPONDING DRIVE DEVICE

(71) Applicant: Audi AG, Ingolstadt (DE)

(72) Inventors: Michael Görgen, Kall (DE); Markus Sonner, Kipfenberg (DE)

(73) Assignee: Audi AG, Ingolstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/986,520

(22) Filed: May 22, 2018

(65) Prior Publication Data

US 2018/0266295 A1 Sep. 20, 2018

Related U.S. Application Data

(62) Division of application No. 14/762,390, filed as application No. PCT/EP2014/000147 on Jan. 21, 2014, now Pat. No. 10,006,331.

(30) Foreign Application Priority Data

Jan. 23, 2013 (DE) ........................ 10 2013 001 080

(51) Int. Cl.
*F01N 3/30* (2006.01)
*F02D 41/00* (2006.01)
(Continued)

(52) U.S. Cl.
CPC ............. *F01N 3/306* (2013.01); *F01N 3/323* (2013.01); *F01N 3/326* (2013.01); *F02B 39/10* (2013.01);
(Continued)

(58) Field of Classification Search
CPC .. F01N 2240/14; F01N 2430/02; F01N 3/306; F01N 3/323; F01N 3/326;
(Continued)

(56) References Cited

U.S. PATENT DOCUMENTS 5,456,079 A 10/1995 Langen
5,459,998 A 10/1995 Hosoya et al.
(Continued)

FOREIGN PATENT DOCUMENTS

DE 43 07 737 9/1993
DE 43 20 880 1/1994
(Continued)

*Primary Examiner* — Thai Ba Trieu
*Assistant Examiner* — Diem T Tran
(74) *Attorney, Agent, or Firm* — Henry M Feiereisen LLC

(57) ABSTRACT

A method for operating a drive device includes heating a hot air stream with a heating device integrated in a cylinder head of an internal combustion engine of the drive device, wherein the internal combustion engine is connected with an exhaust gas system; mixing the hot air stream upstream of a catalytic converter with a cold fresh air stream for adjusting a defined temperature of the hot air stream; and supplying the hot air stream having the adjusted defined temperature to the catalytic converter in at least one operating state of the internal combustion engine so as to heat the catalytic converter.

3 Claims, 1 Drawing Sheet

(51) Int. Cl.
*F01N 3/32* (2006.01)
*F02D 41/02* (2006.01)
*F02B 39/10* (2006.01)

(52) U.S. Cl.
CPC ..... *F02D 41/0087* (2013.01); *F02D 41/0255* (2013.01); *F01N 2240/14* (2013.01); *F01N 2430/02* (2013.01); *F02D 41/0007* (2013.01); *Y02T 10/26* (2013.01)

(58) Field of Classification Search
CPC .. F02B 39/10; F02D 41/0007; F02D 41/0087; F02D 41/0255; Y02T 10/26
USPC .................. 60/284, 280, 289, 290, 299, 303
See application file for complete search history.

(56) References Cited

U.S. PATENT DOCUMENTS

| | | | | |
|---|---|---|---|---|
| 5,666,804 | A | 9/1997 | Sekiya et al. | |
| 5,724,810 | A | 3/1998 | Hosoya et al. | |
| 5,814,283 | A | 9/1998 | Matuoka | |
| 6,182,446 | B1 | 2/2001 | Gunther | |
| 6,751,956 | B2 | 6/2004 | Mayer | |
| 7,487,765 | B1 | 2/2009 | Kohrt | |
| 8,006,487 | B2 | 8/2011 | Gaiser | |
| 8,056,324 | B2 * | 11/2011 | Wiley .................. | F01L 13/065 60/273 |
| 8,091,346 | B2 | 1/2012 | Klapparos | |
| 2003/0074891 | A1 | 4/2003 | Tamura et al. | |
| 2004/0060284 | A1 | 4/2004 | Roberts, Jr. | |
| 2010/0041543 | A1 | 2/2010 | Döring | |
| 2014/0000241 | A1 | 1/2014 | Baler et al. | |

FOREIGN PATENT DOCUMENTS

| | | |
|---|---|---|
| DE | 44 10 820 | 10/1994 |
| DE | 10 2004 048 335 | 4/2006 |
| DE | 10 2006 049 875 | 4/2008 |
| DE | 20 2009 005 251 | 1/2010 |
| DE | 10 2008 038 719 | 2/2010 |
| DE | 10 2010 060 136 | 4/2012 |
| DE | 10 2011 001 596 | 10/2012 |
| DE | 102012016 673 | 2/2014 |
| EP | 1 013 997 | 6/2000 |
| JP | 1024118 | 1/1989 |
| SU | 1125280 | 11/1984 |
| WO | WO 8505405 | 12/1985 |

* cited by examiner

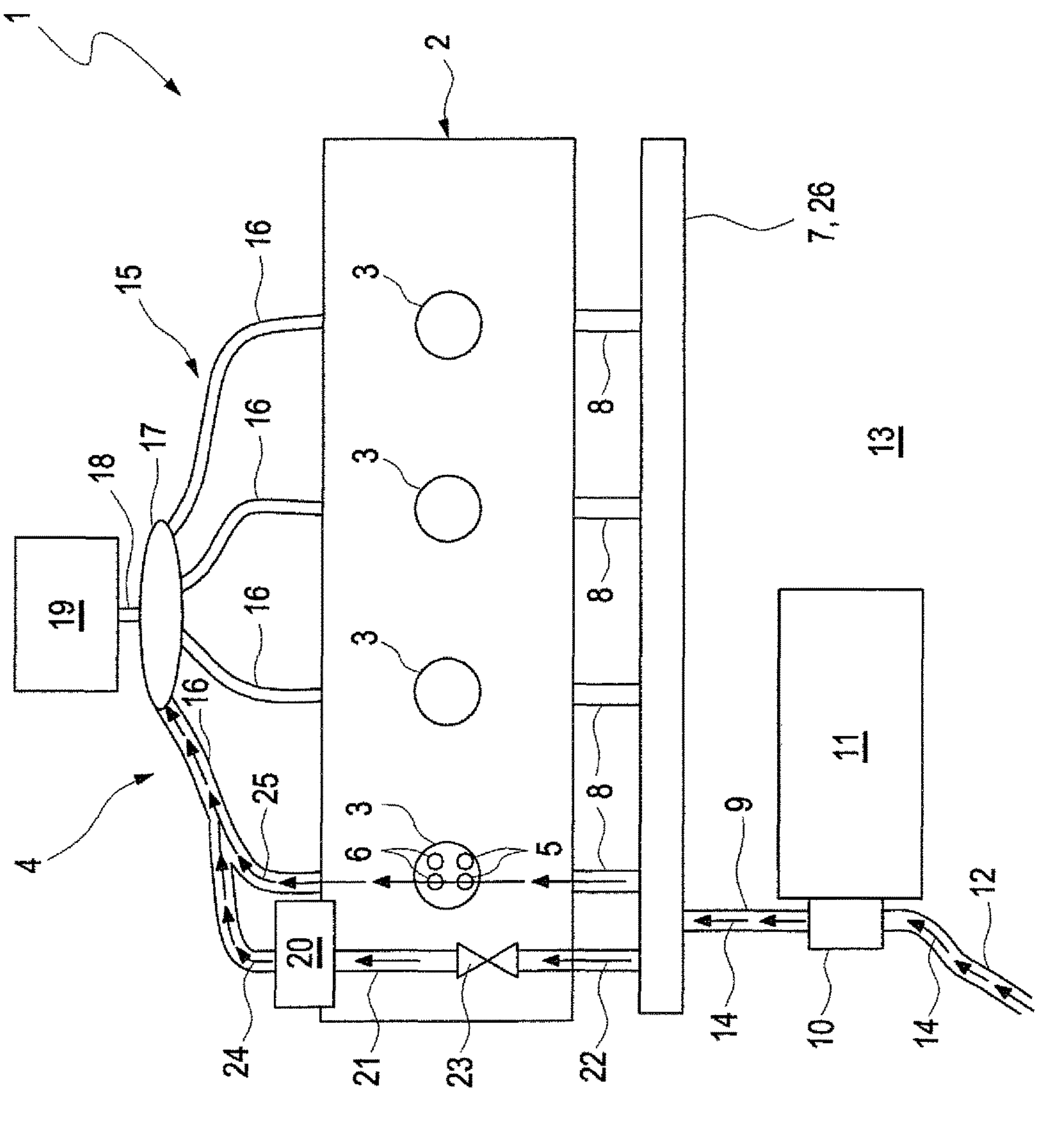
1
2
3
4
5
6
7, 26
8
9
10
11
12
13
14
15
16
17
18
19
20
21
22
23
24
25

METHOD FOR OPERATING A DRIVE DEVICE AND CORRESPONDING DRIVE DEVICE

CROSS-REFERENCES TO RELATED APPLICATIONS

This application is a divisional of prior filed copending U.S. application Ser. No. 14/762,390, filed Jul. 21, 2015, the priority of which is hereby claimed under 35 U.S.C. § 120, and which is the U.S. National Stage of International Application No. PCT/EP2014/000147, filed Jan. 21, 2014, which designated the United States and has been published as International Publication No. WO 2014/114443 and which claims the priority of German Patent Application, Serial No. 10 2013 001 080.2, filed Jan. 23, 2013, pursuant to 35 U.S.C. 119(a)-(d).

BACKGROUND OF THE INVENTION

The invention relates to a method for operating a drive device with an internal combustion engine and with an exhaust gas system connected to the internal combustion system, which exhaust gas system has at least one catalytic converter to which a hot air stream which is heated by means of a heating device is supplied for heating. The invention also relates to a drive device The drive device serves for example for driving a motor vehicle. The drive device can be a part of a hybrid drive device, which beside the drive device has at least one further drive device, which for example has an electric machine in particular only the electric machine. Hereby it can be provided that the drive device and the further drive device, at least temporarily in cooperation, generate a torque for driving the motor vehicle. For this purpose the drive device and the further drive device are for example operatively connected with each other by means of a transmission. Beside the internal combustion engine, the drive device includes the exhaust gas system. The exhaust gas system serves for discharging the exhaust gas generated by the internal combustion engine in the direction of the external environment of the drive device. In order to meet exhaust gas provisions it is required to at least partially purify the exhaust gas before it reaches the external environment. For this purpose the exhaust gas system has the catalytic converter. When passing through the exhaust gas system the exhaust gas of the internal combustion engine is conducted through the catalytic converter in which a catalytically favorable reaction, in particular a reduction, takes place. After passing through the catalytic converter the exhaust gas can be conducted into the external environment by the exhaust gas system.

The catalytic converter usually has to have a defined operating temperature, in order for the reaction to take place and for the purification of the exhaust gas to be performed. The catalytic converter is heated on one hand by way of the exhaust gas which flows through the catalytic converter and which downstream of the internal combustion engine has a high temperature. In particular at low external temperatures and/or a cold start of the drive device, however, the time period that passes until the catalytic converter reaches the operating temperature, may be relatively long. In this time period the reaction cannot occur or can only occur at low efficiency so that the exhaust gas is not reliably or not completely purified.

This problem is particularly pronounced in the hybrid drive device because in this case the internal combustion engine is not constantly in operation. This means that in time periods in which only the further drive device is operated for providing a torque, while the drive device and with this the internal combustion engine is deactivated, the catalytic converter is not heated by the exhaust gas. Correspondingly its temperature decreases. When the temperature falls below the operating temperature, the exhaust gas generated when reactivating the drive device or the internal combustion engine cannot reliably be purified.

For this reason the heating device is provided by means of which the hot air stream is generated and subsequently supplied to the catalytic converter in the at least one operating state of the internal combustion engine for heating the catalytic converter. As a result of operating the heating device, the catalytic converter can thus be maintained at or above its operating temperature also during time periods in which the internal combustion engine is not operated or in which it is deactivated. The heating device is in particular provided in internal combustion engines that are constructed as diesel internal combustion engines. According to the above, the catalytic converter can be heated directly by means of the heating device. This means that the heating device is not or at least not only connected with the catalytic converter in heat transfer connection via a thermally conducting connection. Rather, a fluid for generating the hot air stream is heated and subsequently the catalytic converter is heated by means of the hot air stream.

The temperature that can be achieved by means of the heating device is usually very high and—at least immediately downstream of the heating device—is above the maximally permissible temperature of the catalytic converter. For this reason it can be provided that the heating device for generating the hot air steam is only operated during operation of the internal combustion engine and to mix the hot air stream into the exhaust gas of the internal combustion engine upstream of the catalytic converter. The exhaust gas usually has a temperature that is lower than the temperature of the hot air stream. In the case of a sufficient exhaust gas stream the temperature of the fluid, which flows through the catalytic converter and is composed of the hot air stream and the exhaust gas of the internal combustion engine, is thus sufficiently low and preferably corresponds to at least the operating temperature, however, it is lower than the maximally permissible temperature of the catalytic converter.

However, when the exhaust gas stream is too low, for example because the internal combustion engine is deactivated, the temperature of the hot air stream at optimal efficiency of the heating device is too high. Therefore it can be provided to decrease the efficiency of the heating device to lower the temperature to a degree that is appropriate for the catalytic converter. Such a lowering of the efficiency, however, means that the potential of the heating device is not fully realized and in addition the amount of generated pollutants is greater compared to an operation with optimal efficiency.

From the state of the art for example the printed publications DE 43 20 880 A1 and DE 44 10 820 A1 are known. The former relates to a control device for introducing air into an exhaust gas line of an internal combustion engine. Hereby it is provided to operate a heating device when a start switch is activated. In addition air is to be introduced into an air intake line during and after the start of the internal combustion engine, however, a control valve is not to be open during a predetermined time period $T_1$ after switching on the star switch. The latter printed publication discloses an additional air supply device for an internal combustion engine and a gas heating device for the air supply device.

It is therefore an object of the invention to provide a method for operating a drive device that does not have the aforementioned disadvantages, but enables in particular in each operating state of the internal combustion engine a reliable heating of the catalytic converter by means of the heating device, while at the same time ensuring a low pollutant emission.

According to the invention this is achieved with a method for operating a drive device, including heating a hot air stream with a heating device integrated in a cylinder head of an internal combustion engine of the drive device, said internal combustion engine being connected with an exhaust gas system; mixing the hot air stream upstream of a catalytic converter with a cold fresh air stream for adjusting a defined temperature of the hot air stream; and supplying the hot air stream having the adjusted defined temperature to the catalytic converter in at least one operating state of the internal combustion engine so as to heat the catalytic converter. Hereby it is provided that the hot air stream is mixed upstream of the catalytic converter with a cold fresh air stream for adjusting a defined temperature. It is thus not or not only provided to adjust the temperature of the fluid supplied to the catalytic converter by means of the exhaust gas of the internal combustion engine. Rather the hot air stream is to be combined with the cold air stream prior to flowing through the catalytic converter. In addition it can be provided, in particular when the internal combustion engine is activated, that also the exhaust gas of the internal combustion engine is combined upstream of the catalytic converter with the hot air stream.

The cold fresh air stream consists of fresh air, which is withdrawn from an external environment of the drive device. The fresh air is in particular chemically unaltered, i.e., it has not participated in a chemical reaction, for example combustion or the like, in the drive device. The fresh air of the cold fresh air stream has a temperature that is lower than the temperature of the hot air stream. By selecting an appropriate mass flow of cold fresh air, the defined temperature can be adjusted upstream of the catalytic converter. The defined temperature hereby corresponds for example to the operating temperature of the catalytic converter, above which the catalytic converter enables a complete catalytic reaction. The temperature can, however, also be higher or lower, however it is below the maximally admissible temperature of the catalytic converter. The cold fresh air stream is conducted past the heating device, i.e., it does not flow through the heating device.

By mixing the hot air stream with the cold fresh air stream, the mass flow of the fluid flowing through the catalytic converter is increased. At the same time the temperature is adjusted to a degree that is appropriate of the catalytic converter. Due to the increase of the mass flow, the catalytic converter is heated faster and more evenly than would be possible by means of the hot air stream alone. In addition as explained above, the heating device can be operated with optimal efficiency and/or with lower pollutant emission.

A further embodiment of the invention provides that the cold fresh air stream is conducted through at least one deactivated cylinder of the internal combustion engine or a cylinder of the internal combustion engine that is operated in the trailing throttle mode. The cold fresh air stream thus flows through the cylinder of the internal combustion engine prior to being mixed with the hot air stream and is subsequently supplied to the catalytic converter. For this purpose the valves of the cylinder, in particular at least one inlet valve and at least one outlet valve, are correspondingly adjusted. For example the at least one inlet valve and the at least one outlet are simultaneously opened so that the cold fresh air stream can flow unimpeded through the cylinder.

The cylinder can hereby be deactivated or can be operated in a trailing throttle mode. In both cases no combustion of fuel takes place in the cylinder, so that the cold fresh air stream is not chemically altered when flowing through the cylinder. When the cylinder is deactivated, preferably the entire internal combustion engine is deactivated. When the internal combustion engine is activated, i.e., when it is supplied with fuel or when combustion of fuel takes place in the internal combustion engine, this is not the case for at least one cylinder through which the cold fresh air stream is conducted. For this purpose the cylinder is for example operated in the trailing throttle mode, i.e., the piston assigned to the cylinder is merely moved by at least one further, activated cylinder and/or by an externally provided torque.

A further embodiment of the invention provides that a cold air stream conducted to the heating device is branched off from the cold fresh air stream at a withdrawal point upstream of the internal combustion engine. Up until the withdrawal point the cold air stream and the cold fresh air stream are conducted together, for example in a common line. Together, the cold airstream and the cold fresh air stream form a fresh air stream, which is withdrawn from the external environment of the drive device. At the withdrawal point, the fresh air stream is divided into the cold air stream and the cold fresh air stream. The cold air stream is supplied to the heating device and heated by the heating device so that the cold air stream becomes the hot air stream. The cold fresh air stream on the other hand is, as explained above, conducted so as to circumvent the heating device and, downstream of the heating device, however upstream of the catalytic converter, is united again with the hot air stream, which originated from the cold air stream. The cold fresh air stream hereby for example passes through the at least one cylinder of the internal combustion engine.

A refinement of the invention provides that a fresh air stream which forms the cold air stream and the cold fresh air stream is compressed upstream of the withdrawal point by means of a compressor. As mentioned above, upstream of the withdrawal point the cold air stream and the cold fresh air stream are conducted together in the form of the fresh air stream and are only separated at the withdrawal point. In addition it is provided that this fresh air stream is compressed by means of the compressor. The fresh air stream thus is to be brought to a higher pressure level and subsequently divided into the cold air stream and the cold fresh air stream at the withdrawal point. The compressor is for example an electrically operated compressor or a supercharger, in particular a blower, for example an electrically operated or supported blower.

In a particularly advantageous embodiment of the invention, it is provided that at least one inlet valve and at least one outlet valve of the cylinder are operated so that the cold fresh air steam is conducted in the direction of the catalytic converter. Particularly preferably this is the case when the cylinder, through which the cold fresh air stream is conducted, is operated in the trailing throttle mode. In this case the piston of the cylinder is periodically displaced by at least one further cylinder of the internal combustion engine and/or the externally provided torque. By correspondingly adjusting the inlet valve and the outlet valve, a pumping effect can thus be achieved. By means of this pumping effect the mass flow of the cold fresh air stream can be increased and/or adjusted in a targeted manner. In order to achieve a most continuous pumping effect, it is of course advantageous when the cold fresh air stream is conducted in parallel through multiple cylinders that are operated in the trailing throttle mode.

A refinement of the invention provides to use a burner, which is operated with liquid or gaseous fuel as heating device. Such a burner is particularly suited for the here provided indirect heating of the catalytic converter. The burner is preferably operated with liquid and/or gaseous fuel. The fuel is for example introduced into a mixture-generating chamber of the burner through a fuel conduction line. An air supply line can also lead into the mixture-generating chamber. Correspondingly air and also fuel can be conducted into the mixture-generating chamber and subsequently combusted for heating the catalytic converter. In this way the catalytic converter can be brought very quickly to the desired operating temperature so that a purification of the exhaust gas can be performed with high efficiency. The advantage of the burner is a very high energy density, a variable mounting position and a simple construction. Particularly preferably the heating device is constructed according to the heating device described in patent application DE 10 2012 016 673. The mentioned patent application is incorporated herewith by reference for a preferred embodiment of the invention. In particular the drive device can additionally have the features of one or more of the claims of the mentioned patent application in addition or alternatively to the already present features.

It can further be provided that an electrically operated or electrically supported compressor is used as compressor. The compressor can also be exclusively operated electrically or electrically supported. In the latter case it is for example part of a charger, which can be constructed as compressor or as exhaust gas turbo charger.

It can also be provided that the compressor is part of an exhaust gas turbo charger, as mentioned above. Particularly preferably, the exhaust gas turbo charger is electrically supported, so that the compressor can be used for compressing the fresh air stream also when the internal combustion engine is deactivated, by operating the compressor purely electrically. The exhaust gas turbo charger can, however, also be electrically supported in case the exhaust gas mass stream, which is generated by the internal combustion engine and supplied to the exhaust gas turbo charger, is not sufficient to sufficiently compress the fresh air stream.

The invention also relates to a drive device, in particular for implementing the method described above, with an internal combustion engine and with an exhaust gas system, which is connected to the internal combustion engine, and which has at least one catalytic converter to which a hot air stream heated by a heating device can be conducted in at least one operating state of the internal combustion engine for heating the catalytic converter. It is provided that the exhaust gas device is configured to mix the hot air stream upstream of the catalytic converter with a cold fresh air stream to adjust a defined temperature. The advantages of such an approach or such a construction of the drive device have already been discussed. The drive device and the method implemented therewith can be refined according to the above description so that reference is made to thereto.

In an advantageous embodiment of the invention it is provided that the heating device is integrated in a cylinder head of the internal combustion engine. In such an arrangement a particularly compact or space-saving arrangement of the heating device is possible. This is in particular the case when the mixture-generating chamber of the heating device is formed directly in the cylinder head of the internal combustion engine, for example by casting. In this context reference is again made to the patent application 10 2012 016 673 whose features can be advantageously used for refining the invention in addition to the features described herein.

BRIEF DESCRIPTION OF THE DRAWING

In the following, the invention is described by way of the exemplary embodiments shown in the drawing, without limiting the invention. It is shown in the sole FIGURE a schematic representation of the drive device with an internal combustion engine and an exhaust gas system.

DETAILED DESCRIPTION OF PREFERRED EMBODIMENTS

The FIGURE shows a schematic representation of a drive device 1 with an internal combustion engine 2, which has multiple cylinders 3, and with an exhaust gas system 4. Each cylinder 3 has at least one inlet valve 5 and at least one outlet valve 6. The inlet valves 5 of the cylinders 3 are connected to the air distributor 7, which is preferably constructed as a common air distributor. For this purpose connection lines 8 are provided. The air distributor 7 is fluidly connected to a compressor 10 via a line 9, which compressor can for example be driven by means of an electric motor 11. In addition or as an alternative the compressor 10 can also be a part of a charger, in particular an exhaust gas turbo charger or a blower. On the side facing away from the air distributor 7, the compressor 10 is fluidly connected to an external environment 13 of the drive device 1 via a line 12. By means of the compressor 10 the fresh air can thus be suctioned from the external environment 13 and conducted to the air distributor 7 in the form of a fresh air stream 14. Preferably an air filter is fluidly arranged between the compressor 10 and the external environment 13.

The exhaust gas system 4 has an exhaust manifold 15, which for each cylinder 3 has at least one exhaust gas line 16. The exhaust gas line is respectively fluidly connected to the at least one outlet valve 6 of the respective cylinder 3 and serves in particular for discharging exhaust gas form the internal combustion engine 2. The exhaust gas lines 16 lead to an exhaust gas turbo charger 17 or a turbine of the exhaust gas turbo charger 17. For this purpose the exhaust gas turbo charger 17 or the turbine is for example constructed multi-branch. As an alternative it can also be provided that at least two of the exhaust gas lines 16 upstream of the exhaust gas turbo charger 17 are united and together lead to the exhaust gas turbo charger 17. Preferably all exhaust gas lines 16 are combined upstream of the exhaust gas turbo charger 17. The turbine of the exhaust gas turbo charger 17 can serve for driving the compressor 10, wherein in this case the compressor 10 is a part of the exhaust gas turbo charger 17. On the side of the exhaust gas turbo charger 17 facing away from the exhaust gas lines 16 a further line 18 is provided, which leads to a catalytic converter 19. Fluid flowing through the exhaust gas lines 16, in particular exhaust gas, thus flows through the exhaust gas turbo charger 17 and subsequently through the catalytic converter 19. Downstream of the catalytic converter 19 the fluid is again conducted into the external environment 13. It is noted that the exhaust gas turbo charger 17 is optional. The exhaust gas lines 16 can alternatively be connected to the catalytic converter 19 in a separate or already combined state.

For heating the catalytic converter 19 in at least one operating state of the internal combustion engine 2, a heating device 20 is provided, which is for example constructed as a burner, which is operated with liquid or gaseous fuel. The heating device 20 is preferably integrated into the internal combustion engine 2, in particular into the cylinder head of the internal combustion engine 2. It is connected to the air distributor 7 via a line 21. Through the line 21 a cold air stream 22 can be conducted to the heating device 20, wherein a flow rate of the cold air stream 22, i.e., the mass or the volume per time unit, can preferably be adjusted with a valve 23. The valve 23 serves as cross section adjustment element in order to adjust the flow cross-section of the line 21. Of course the valve 23 can also be integrated in the heating device 20. In the heating device 20 the cold air stream 22 is heated up and subsequently conducted in the form of a hot air stream in the direction of the catalytic converter 19. The hot air stream 24 preferably has a high temperature, which is for example higher than a maximally permissible temperature of the catalytic converter 19.

For this reason it is required to lower the temperature of the fluid conducted to the catalytic converter 19. For this purpose the hot air stream 24 is mixed upstream of the catalytic converter 19 with exhaust gas of the internal combustion engine 2 and/or with a cold fresh air stream 25 for adjusting a defined temperature. F or this purpose the hot air stream 24 is for example conducted to one of the exhaust gas lines 16 or as an alternative to a common exhaust gas line in which the exhaust gas lines 16, in particular all exhaust gas lines 16, are combined. The cold fresh air stream 25 like the cold air stream 22 is withdrawn form the air distributor 7. In particular the fresh air stream 14 is divided in the air distributor 7, which insofar represents the withdrawal point 26, into the cold air stream 22 and the cold fresh air stream 25. The cold air stream 22 is heated by means of the heating device 20, and is for example part of a chemical reaction. In particular, fuel is mixed with the cold air stream 22 and combusted. Correspondingly, the hot air stream 24, which originates from the cold air stream 22, is present downstream of the heating device 20.

Upstream of the catalytic converter, the hot air stream 24 is combined with the cold fresh air stream 25. Particularly preferably, as shown, the cold fresh air stream 25 is conducted through at least one cylinder 3, in particular without being chemically altered. The corresponding cylinder 3 is thus deactivated, so that no combustion takes place therein. For example the cylinder 3 is operated in a trailing throttle mode. Hereby the at least one inlet valve 5 and the at least one outlet valve 6 of the corresponding cylinder 3 are operated so that the cold fresh air stream 25 is transported in the direction of the catalytic converter 19. The described method is preferably performed when the internal combustion engine 2 is deactivated. However, it can also be performed when the internal combustion engine 2 is only partially deactivated, wherein for example at least one of the cylinders 3 is active, i.e., fuel is combusted in this cylinder. Only the at least one cylinder 3 through which the cold fresh air stream 25 is conducted is deactivated or is operated in the trailing throttle mode.

With such a drive device 1 a high mass stream of a heated fluid can be conducted to the catalytic converter 19 to heat the catalytic converter also when the internal combustion engine 2 is deactivated. The temperature of the fluid conducted to the catalytic converter 19 preferably corresponds to at least its operating temperature, however, it is lower than the maximally permissible temperature, above which damage to the catalytic converter 19 may occur. As explained above only a portion of the fresh air stream 14 is hereby heated in the form of the cold air stream 22 and subsequently supplied to the catalytic converter 19 as hot air stream 24. The other portion of the fresh air stream 14 is conducted around the heating device as cold fresh air stream 25, preferably through the at least one cylinder 3 of the internal combustion engine 2. Correspondingly, the temperature of the cold fresh air stream 25 is lower than the one of the hot air stream 24. By appropriately selecting the mass streams of the hot air stream 24 and the cold fresh air stream 25 the temperature of the fluid conducted to the catalytic converter 19 can be adjusted to a desired value. Thus it is possible to always operate the heating device at an optimal efficiency, without risking damage to the catalytic converter 19 when heating the catalytic converter.

What is claimed is:

1. A drive device, comprising:

an internal combustion engine having a cylinder head with a plurality of cylinders;

an exhaust gas system connected to the internal combustion engine and including a catalytic converter;

a heating device integrated in the cylinder head and heating a cold air stream to produce a hot air stream which is mixed upstream of the catalytic converter with a chemically unaltered cold fresh air stream for adjusting a defined temperature of the hot air stream to provide the adjusted hot air stream having the adjusted defined temperature and supplied to the catalytic converter in at least one operating state of the internal combustion engine so as to heat the catalytic converter;

a conduit conducting the chemically unaltered cold fresh air through at least one of the cylinders which is operated in a trailing throttle mode;

an air distributor branching off the cold air stream from a fresh air stream at a retrieval point upstream of the internal combustion engine and conducting the cold air stream to the heating device;

a compressor compressing the fresh air stream upstream of the retrieval point; and a connecting line supplying the fresh air stream to the air distributor for providing the cold air stream and the chemically unaltered cold fresh air stream.

2. The drive device of claim 1, wherein the at least one cylinder has at least one inlet valve and at least one outlet valve operating so that the chemically unaltered cold fresh air stream is transported in a direction of the catalytic converter.

3. The drive device of claim 1, wherein the heating device is constructed as a burner operating with liquid or gaseous fuel.

* * * * *